US007395147B2

(12) United States Patent
Livshiz et al.

(10) Patent No.: US 7,395,147 B2
(45) Date of Patent: Jul. 1, 2008

(54) TORQUE CONTROL OF TURBOCHARGED ENGINE

(75) Inventors: Michael Livshiz, Ann Arbor, MI (US); Douglas J. Babcock, Dexter, MI (US); Joseph R. Dulzo, Novi, MI (US); Emil Ritzen, Sodertalje (SE); Anne E. Vondracek, Novi, MI (US); Lennarth Zander, Stockholm (SE)

(73) Assignee: GM Global Technology Operations, Inc., Detroit, MI (US)

( * ) Notice: Subject to any disclaimer, the term of this patent is extended or adjusted under 35 U.S.C. 154(b) by 121 days.

(21) Appl. No.: 11/531,568

(22) Filed: Sep. 13, 2006

(65) Prior Publication Data

US 2008/0060356 A1 Mar. 13, 2008

(51) Int. Cl.

*G06F 17/00* (2006.01)
*F02B 33/44* (2006.01)
*F02D 11/10* (2006.01)

(52) U.S. Cl. ...................... 701/103; 123/350; 123/399; 60/605.1; 701/110

(58) Field of Classification Search ......... 701/101-105, 701/110, 111, 115; 123/350, 352, 361, 396, 123/399, 403, 559.1; 60/605.1, 605.2
See application file for complete search history.

(56) References Cited

U.S. PATENT DOCUMENTS

| | | | | |
|---|---|---|---|---|
| 6,039,025 | A * | 3/2000 | Iwano et al. | 123/399 |
| 6,349,704 | B2 * | 2/2002 | Hosokawa et al. | 123/478 |
| 6,761,146 | B1 * | 7/2004 | Livshiz et al. | 123/361 |
| 6,840,215 | B1 * | 1/2005 | Livshiz et al. | 123/352 |
| 6,895,946 | B1 * | 5/2005 | Livshiz et al. | 123/559.1 |
| 6,968,824 | B1 * | 11/2005 | Matthews et al. | 123/350 |
| 7,021,282 | B1 * | 4/2006 | Livshiz et al. | 123/347 |
| 7,069,905 | B1 * | 7/2006 | Livshiz et al. | 123/361 |
| 2005/0065707 | A1 * | 3/2005 | Kaga | 701/103 |
| 2007/0130945 | A1 * | 6/2007 | Rollinger et al. | 60/605.1 |
| 2007/0131206 | A1 * | 6/2007 | Rollinger et al. | 123/559.1 |

* cited by examiner

*Primary Examiner*—Willis R Wolfe, Jr.

(57) ABSTRACT

An engine system includes an engine having an intake manifold and a turbocharger that supplies compressed air to the intake manifold. An engine control module calculates a desired pre-throttle pressure of air before the throttle and calculates a desired manifold air flow into the engine. The engine control module determines a desired pre throttle pressure area based on the desired air per cylinder, desired manifold pressure and RPM and generates control signals to control the engine with the turbocharger.

32 Claims, 3 Drawing Sheets

Driver Input Device
Control Module
Exhaust
Air
10
12
14
16
18
20
22
24
26
28
30
34
36
40
42
43
44
46
48
50
52
56
58
60
64

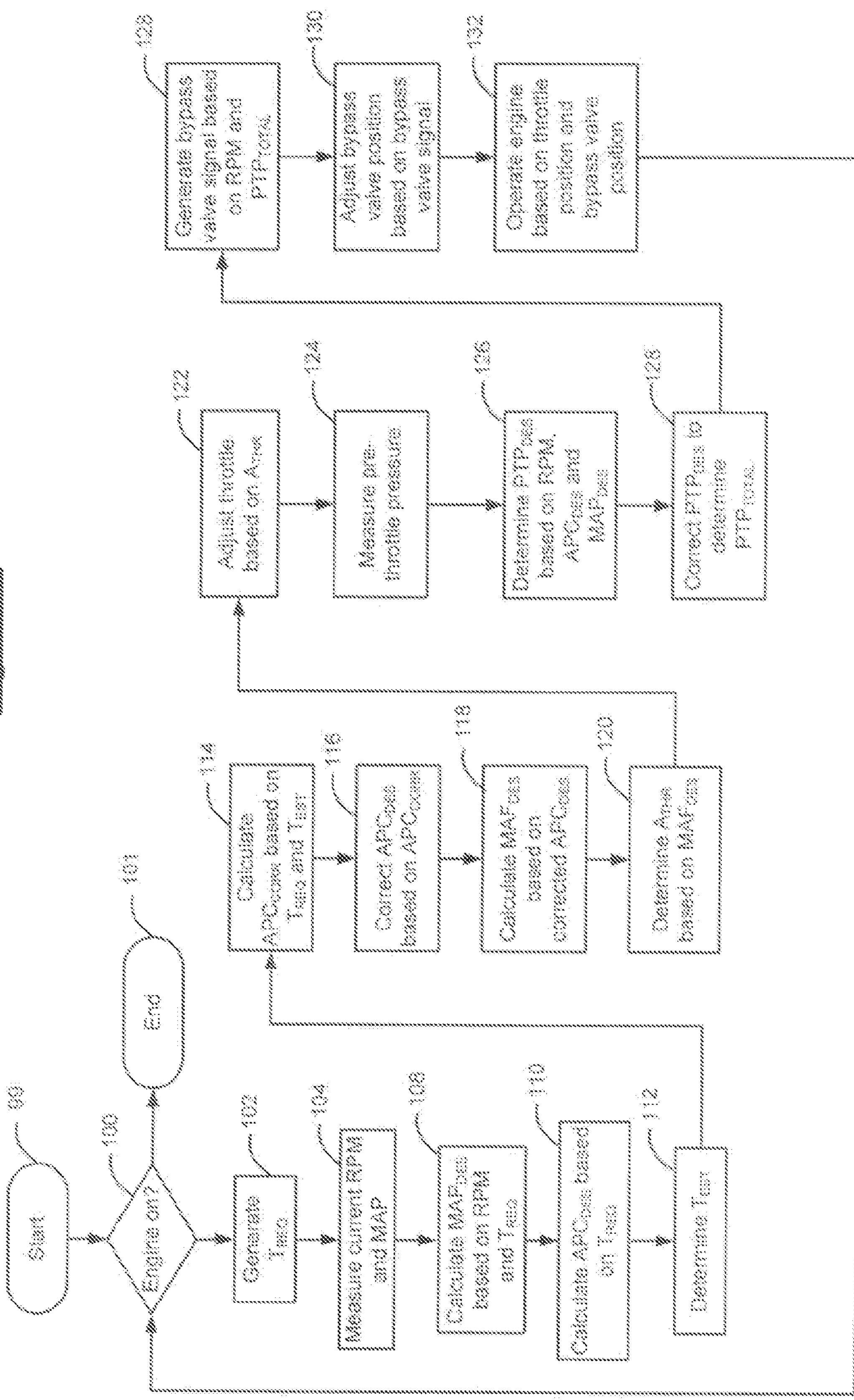
Figure 2
Start
99
Engine on?
100
End
101
Generate T EEQ
102
Measure current RPM and MAP
104
Calculate MAP DES based on RPM and T EEQ
106
Calculate APC DES based on T EEQ
110
Determine T EST
112
Calculate APC CORR based on T EEQ and T EST
114
Correct APC DES based on APC CORR
116
Calculate MAF DES based on corrected APC DES
118
Determine A THR based on MAF DES
120
Adjust throttle based on A THR
122
Measure pre-throttle pressure
124
Determine PTP DES based on RPM, APC DES and MAP DES
126
Correct PTP DES to determine PTP CORR
128
Generate bypass valve signal based on RPM and PTP CORR
128
Adjust bypass valve position based on bypass valve signal
130
Operate engine based on throttle position and bypass valve position
132

Bypass Module
Bypass Valve Signal
Engine Control Module
Throttle Position
Bypass Valve Position
PTP Sensor
Throttle Signal
RPM
Torque Correcting Module
Calculating Module
Correction Module
Calculation Module
208
201
206
200
226
218
216
214
212
204
210
202
222
224

TORQUE CONTROL OF TURBOCHARGED ENGINE

FIELD OF THE INVENTION

The present invention relates to engines, and more particularly to a torque control system for a turbocharged engine.

BACKGROUND OF THE INVENTION

Internal combustion engines combust an air and fuel mixture within cylinders to drive pistons, which produces drive torque. Air flow into the engine is regulated via a throttle. More specifically, the throttle adjusts a throttle area, which increases or decreases air flow into the engine, As the throttle area increases, the air flow into the engine increases. A fuel control system adjusts a fuel injection system to provide a desired air/fuel mixture to the cylinders. As can be appreciated, increasing the air and fuel per unit volume in the cylinders increases the torque output of the engine. Some engines include a turbocharger that is driven by engine exhaust and that compresses air flowing into the engine. By compressing the air, a greater air and fuel per unit area within the cylinder can be increased. Therefore, greater torque output can be achieved.

Engine control systems have been developed to accurately control engine torque output to achieve a desired torque. Traditional engine control systems however, do not control the engine torque output as accurately as desired. Further, traditional engine control systems do not provide as rapid of a response to control signals as is desired.

SUMMARY OF THE INVENTION

An engine control system for an engine having a throttle includes a desired pre-throttle pressure module that receives a torque request signal and that determines a desired pre-throttle pressure. An air-per-cylinder module determines a desired air-per-cylinder of the throttle. A manifold absolute pressure module receives the torque request signal and determines a desired manifold absolute pressure. The desired pre-throttle pressure is based on the desired air-per-cylinder, the manifold absolute pressure and engine speed.

In other features, a system comprising the engine control further includes a turbocharger driven by exhaust from the engine. A pressure sensor is located upstream from the throttle and measures a pre-throttle pressure. The turbocharger increases the charge air density. The pressure difference across the throttle and exhaust flow through it regulates a level of the pre-throttle pressure.

In still another features, a total pre-throttle pressure module determines a total pre-throttle pressure based on the desired pre-throttle pressure and a measured pre-throttle pressure.

In yet another feature, a turbine bypass module generates a valve signal based on the total pre-throttle pressure and engine speed.

In yet another feature, a bypass valve selectively opens based on the valve signal.

In still another feature, the turbine bypass module generates the valve signal when the measured pre-throttle pressure exceeds a predetermined value.

In still another feature, the turbine bypass module generates the valve signal based on a reference table.

In yet another feature, the reference table is based on engine speed and the total pre-throttle pressure.

In yet another feature, an engine control module determines the measured pre-throttle pressure and determines the engine speed.

In still another feature, the control module determines a desired mass air flow based on the desired air-per-cylinder.

In yet another feature, the engine control module determines a throttle area based on the desired mass air flow.

In yet another feature, a torque estimating module determines an estimated torque based on the RPM and other engine inputs.

In still another feature, a correction module corrects the measured pre-throttle pressure based on a predetermined correction factor.

In yet another feature, the correction module corrects the estimated torque based on a predetermined correction factor.

In yet another feature, a driver input device generates the torque request signal.

In still another feature, the driver input device is an accelerator pedal.

BRIEF DESCRIPTION OF THE DRAWINGS

The present invention will become more fully understood from the detailed description and the accompanying drawings, wherein:

FIG. 2 is a flowchart illustrating the engine torque control system according to the present invention.

DETAILED DESCRIPTION OF THE PREFERRED EMBODIMENTS

Figure 1:
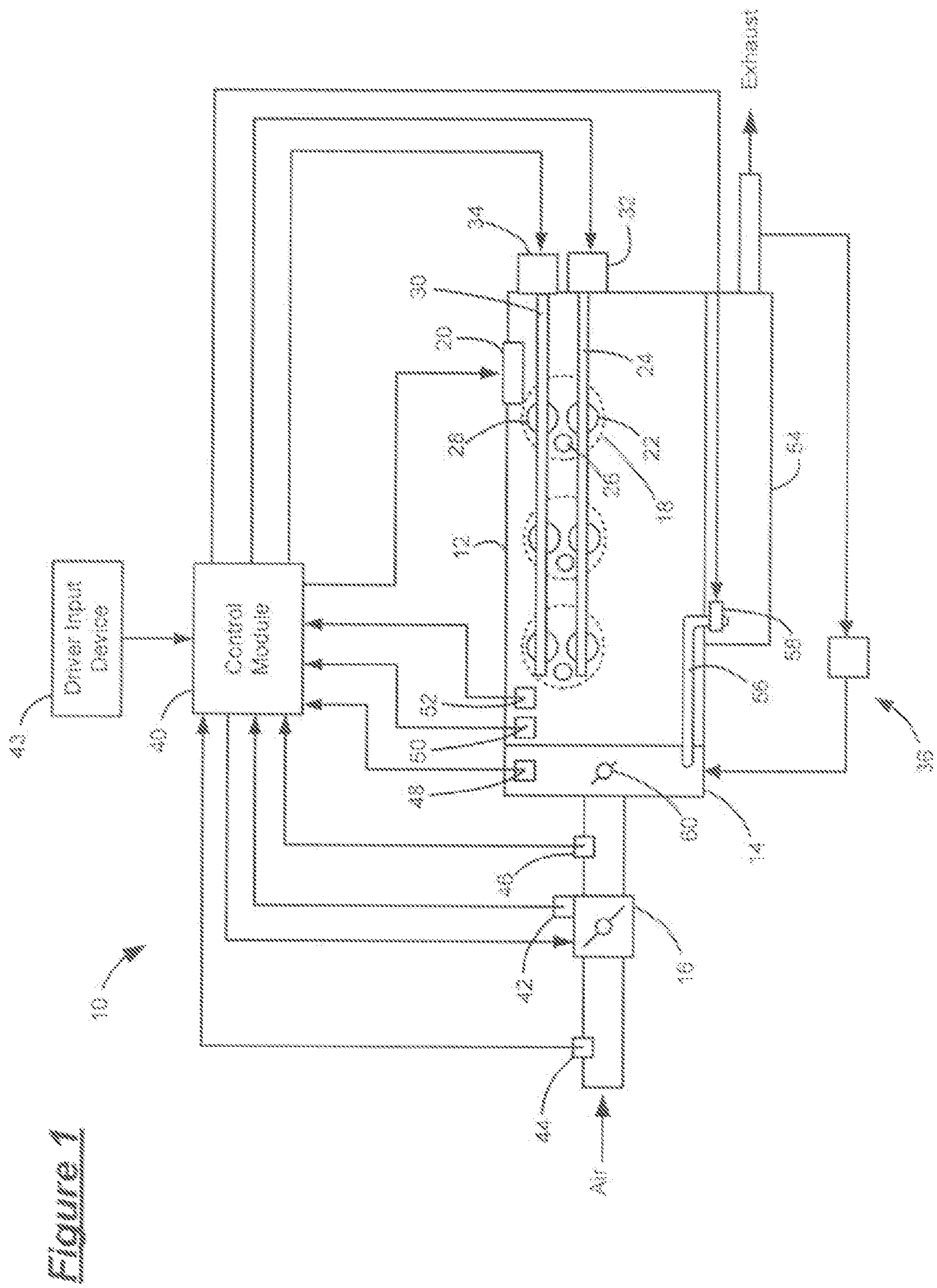
FIG. 1 is a schematic illustration of an exemplary engine system including a turbocharger according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Referring now to FIG. 1, an engine system 10 includes an engine 12 that combusts an air and fuel mixture to produce drive torque. Air is drawn or pushed (when PTP is greater than Baro) into an intake manifold 14 through a throttle 16. The throttle 16 regulates mass air flow into the intake manifold 14. Although three cylinders 18 are illustrated, it can be appreciated that the coordinated torque control system of the present invention can be implemented in engines having a plurality of cylinders including, but not limited to, 2, 4, 5, 6, 8, 10 and 12 cylinders.

A fuel injector (not shown) injects fuel that is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinders 18. A spark plug 26 initiates combustion of the air/fuel mixture, which drives the piston in the cylinders 18. Although a spark plug 26 is shown, it can be appreciated that another method for initiating combustion may be used.

The piston in turn, drives a crankshaft (not shown) to produce drive torque. Exhaust within the cylinders 18 is forced out an exhaust port (not shown) when an exhaust valve 28 is in an open position. The position of the exhaust valve 28 is regulated by an exhaust cam shaft 30. The exhaust is treated in an exhaust system (not shown) and is released to atmosphere. Although single intake and exhaust valves 22, 28 are illustrated, it can be appreciated that the engine 12 can include multiple intake and exhaust valves 22, 28 per cylinder 18.

The engine system 10 can include an intake cam phaser 32 and an exhaust cam phaser 34 that respectively regulate the rotational timing of the intake and exhaust cam shafts 24, 30. More specifically, the timing or phase angle of the respective intake and exhaust cam shafts 24, 30 can be retarded or advanced with respect to each other or with respect to a location of the piston within the cylinder 18 or crankshaft position, In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque can be regulated.

The engine system 10 can also include an exhaust gas recirculation (EGR) system (not shown). The EGR system typically includes an EGR valve that regulates exhaust flow back into the intake manifold 14. The EGR system is generally implemented to regulate emissions. However, the mass of exhaust air that is recirculated back into the intake manifold 14 can affect engine torque output.

A control module 40 operates the engine based on the torque control approach of the present invention. The torque control approach includes regulating torque based on operation of the throttle 16 and a turbocharger 41. More specifically, the control module 40 generates a throttle control signal based on an engine torque request ($T_{REQ}$) and a throttle position signal generated by a throttle position sensor (TPS) 42. $T_{REQ}$ is generated based on a driver input device (DID) 43 such as a position of an accelerator pedal (not shown). The control module 40 commands the throttle 16 to a steady-state position to achieve an effective throttle area ($A_{THR}$). A throttle actuator (not shown) adjusts the throttle position based on the throttle control signal. The throttle actuator can include a motor or a stepper motor, which provides limited and/or coarse control of the throttle position. The control module 40 can also regulate the fuel injection system 20, the cam shaft phasers 32, 34 and the EGR system (not shown) to achieve $T_{REQ}$.

A pre-throttle pressure sensor 44 measures air pressure in an area located upstream from the throttle ($PTP_{MEAS}$). A mass airflow (MAF) sensor 46 is responsive to the mass of the intake air flow and generates a MAP signal. A manifold absolute pressure (MAP) sensor 48 is responsive to the pressure within the intake manifold 14 and generates a MAP signal. An engine oil temperature sensor 50 is responsive to an oil temperature and generates an engine temperature signal. An engine speed sensor 52 is responsive to an engine speed (i.e., RPM) of the engine 12 and generates in an engine speed signal. The signals generated by the sensors are received by the control module 40.

$A_{THR}$ is determined based on a desired manifold air flow ($MAF_{DES}$) and a desired manifold absolute pressure ($MAP_{DES}$). $MAF_{DES}$ is determined based on a desired air-per-cylinder ($APC_{DES}$) and is characterized by the following relationships:

$$APC_{DES} = T_{APC}^{-1}(T_{REQ}, S, I, E, AF, OT, N); \text{ and}$$

$$MAF_{DES} = \frac{APC_{DES} \cdot R}{k_{CTL}}$$

where: S is the ignition spark timing;

I is the intake cam phase angle;

E is the exhaust cam phase angle;

AF is the air/fuel ratio;

OT is the oil temperature; and

N is the number of cylinders.

$MAP_{DES}$ is determined based on RPM and $T_{REQ}$ and is characterized by the following equation:

$$MAP_{DES}=T_{MAP}^{-1}((T_{REQ}+f(\Delta T)),S,I,E,AF,OT,N),$$

where $\Delta T$ is the difference between first and second torque estimations. The calculations of $MAF_{DES}$, $APC_{DES}$ and $MAP_{DES}$ are discussed in further detail in commonly assigned U.S. patent application Ser. No. 10/664,172 filed Sep. 17, 2003, now U.S. Pat. No. 6,840,215, the disclosure of which is expressly incorporated herein by reference.

The turbocharger 41 includes a turbine (not shown) that is driven by engine exhaust to operate a compressor (not shown). More particularly, air is drawn into the compressor (not shown) and is compressed therein. The turbocharger 41 delivers compressed air to the throttle 16. The throttle 16 regulates the quantity of air delivered to the cylinders 18 based on $A_{THR}$. The compressed air is mixed with fuel and is combusted within the cylinders 18. As the volume of air inside the cylinders increases, pressure that accumulates upstream from the throttle (i.e. pre-throttle pressure (PTP)) increases.

A second conduit 54 is coupled to the turbocharger 41 and its opening is located upstream from the turbine. A bypass valve 56 is disposed within the second conduit 54 and selectively opens to divert exhaust energy around the turbine. By diverting exhaust energy, the speed of the turbine is reduced and PTP is decreased.

PTP can be regulated to achieve $T_{REQ}$. A desired PTP ($PTP_{DES}$) is based on RPM, $APC_{DES}$ and $MAP_{DES}$. A total PTP ($PTP_{TOTAL}$) based on $PTP_{DES}$ and a corrected measured PTP ($PTP_{MEAS}$) can be characterized by the following relationships:

$$PTP_{DES}=f(RPM,APC_{DES})+MAP_{DES}; \text{ and}$$

$$PTP_{TOTAL}=PTP_{DES}+PID(PTP_{DES}-PTP_{MEAS})$$

Accordingly the bypass valve 56 can be adjusted according to a predetermined lookup table based on $PTP_{TOTAL}$ and RPM). The lookup table can be characterized by the following equation:

$$VALVE_{BYPASS}=f(PTP_{TOTAL},RPM)$$

Alternatively the bypass valve 56 can be adjusted based on a comparison between $PTP_{TOTAL}$ and PTP threshold value $PTP_{THR}$. Specifically, the control module 40 can compare $PTP_{TOTAL}$ to $PTP_{THR}$. When $PTP_{TOTAL}$ exceeds $PTP_{THR}$, the control module outputs a signal that opens the bypass valve 56. When the $PTP_{TOTAL}$ decreases below $PTP_{THR}$, the control module 40 commands the bypass valve 56 to close.

The calculations of $MAF_{DES}$, $APC_{DES}$ and $MAP_{DES}$ are discussed in further detail in commonly assigned U.S. patent application Ser. No. 10/664,172, filed Sep. 17, 2003, the disclosure of which is expressly incorporated herein by reference in its entirety.

Referring now to FIG. 2, control determines whether the engine 12 is running in step 100. When the engine 12 is not running, control ends in step 101. When the engine 12 is running, control generates $T_{REQ}$ based on the driver input device 43 in step 102. In step 104, control measures the current RPM and MAP. Control determines $MAP_{DES}$ based on RPM and $T_{REQ}$ in step 106. In step 108, control determines a desired air-per-cylinder ($APC_{DES}$) based on $T_{REQ}$.

In step 110, control determines a torque estimate ($T_{EST}$). $T_{EST}$ is determined based on RPM, spark and a dilution estimate using a steady-state torque estimator, as discussed in detail in commonly assigned U.S. Pat. No. 6,704,638, issued Mar. 9, 2004, the disclosure of which is expressly incorporated herein by reference in its entirety. In step 112, control calculates an air-per-cylinder correction ($APC_{CORR}$) based on $T_{REQ}$ and $T_{EST}$. Control corrects $APC_{DES}$ based on $APC_{CORR}$ in step 114.

In step 116, control determines $MAF_{DES}$ based on the corrected $APC_{DES}$. $A_{THR}$ is determined based on $MAF_{DES}$ in step 118. In step 120, control adjusts the throttle 16 based on $A_{THR}$. Control measures a pre-throttle pressure in step 122 In step 124, control determines a desired pre-throttle pressure ($PTP_{DES}$) based on RPM, $APC_{DES}$ and $MAP_{DES}$. Control corrects $PTP_{DES}$ and determines $PTP_{TOTAL}$ in step 126.

Control generates a bypass signal based on RPM and $PTP_{TOTAL}$ in step 128. The bypass signal controls the position of the bypass valve 56. In step 130, control adjusts the position of the bypass valve 56. In step 132, control operates the engine based on the throttle position and the bypass valve position and returns to step 100.

Figure 3:
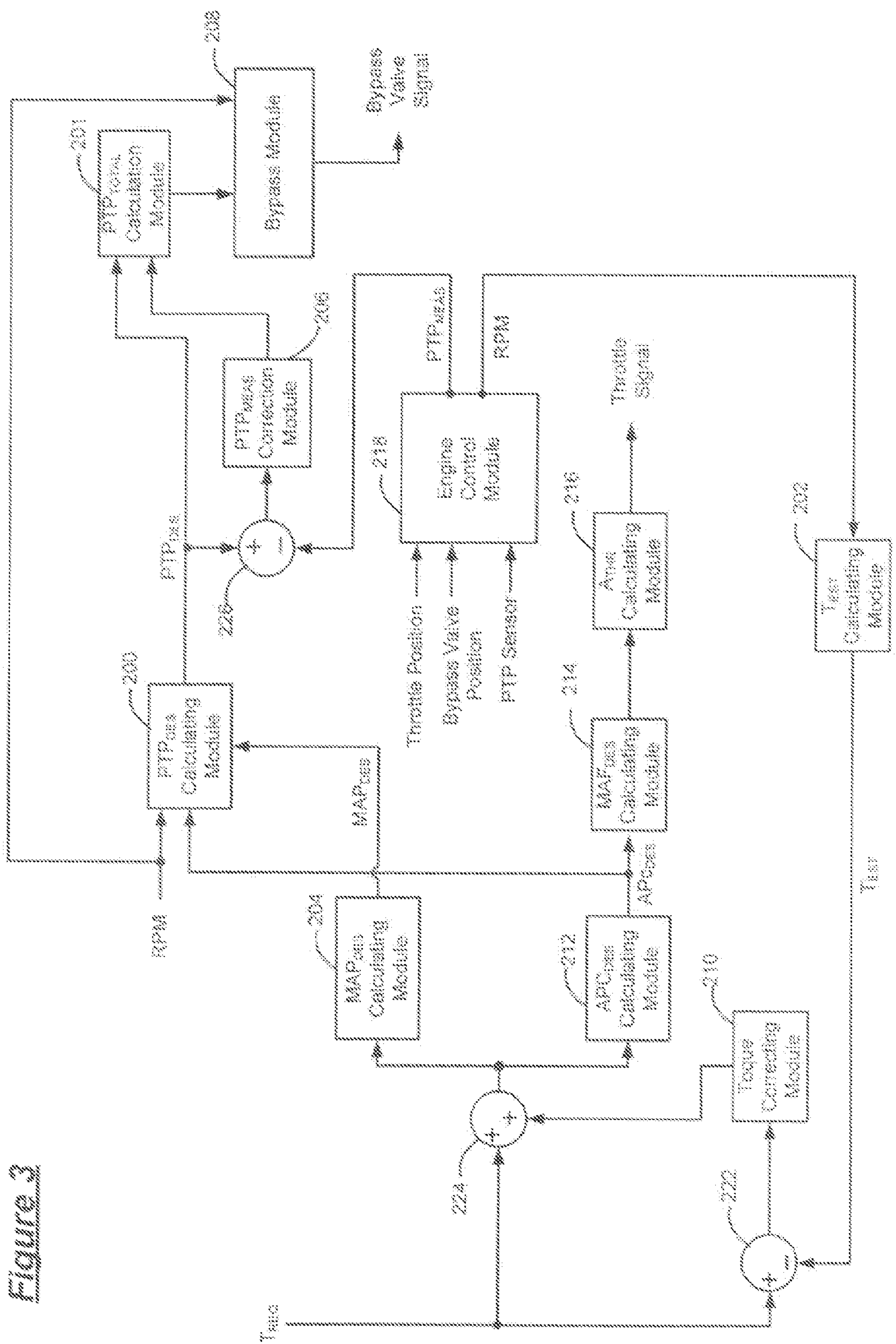
FIG. 3 is a block diagram illustrating modules that execute the engine torque control according to the present invention.

Referring now to FIG. 3, exemplary modules that execute the coordinated torque control will be discussed. The modules include a $PTP_{DES}$ calculating module 200, a $PTP_{TOTAL}$ calculating module 201, a $T_{EST}$ calculating module 202, a $MAP_{DES}$ calculating module 204, a measured pre-throttle pressure ($PTP_{MEAS}$) module 206, a bypass valve module 208, a torque correcting module 210, an $APC_{DES}$ calculating module 212, a $MAF_{DES}$ calculating module 214, an $A_{THR}$ calculating module 216 and an engine control module 218.

The engine control module 218 receives a measured throttle position signal, a measured bypass valve position signal and a $PTP_{SENSOR}$ signal. The measured throttle position signal indicates a current position of the throttle 16. The measured bypass valve position signal indicates a current position of the bypass valve 56. Based on the positions of the throttle 16 and bypass valve 56, the engine control module 218 outputs a measured pre-throttle pressure ($PTP_{MEAS}$) and a measured torque ($T_{MEAS}$). Additionally, the engine control module 218 determines the speed of the engine (RPM) and also a measured pre-throttle pressure ($PTP_{MEAS}$) based on a signal received from the PTP sensor 44.

The $T_{EST}$ calculating module 202 calculates $T_{EST}$ based on RPM and outputs $T_{EST}$ to a summer 222. The summer 222 outputs the difference between $T_{REQ}$ and $T_{EST}$ ($T_{TOTAL}$), which is output to the torque correcting module 210. A corrected torque ($T_{CORR}$) is calculated by the torque correcting module 210 and is output to a summer 224.

The summer 224 outputs the sum of $T_{REQ}$ and $T_{CORR}$ to the $APC_{DES}$ calculating module and the $MAP_{DES}$ calculating module 204. The $APC_{DES}$ calculating module 212 calculates $APC_{DES}$ based on $T_{REQ}$ and $T_{TOTAL}$ $APC_{DES}$ is output to the $MAF_{DES}$ calculating module 214 and to the $PTP_{DES}$ calculation module 200. The $MAP_{DES}$ calculating module 204 calculates $MAP_{DES}$ based on $T_{REQ}$ and $T_{CORR}$, which is output to the $PTP_{DES}$ calculating module 200.

The $MAF_{DES}$ calculating module 214 calculates $MAF_{DES}$ based on the $APC_{DES}$ and outputs $MAF_{DES}$ to the $A_{THR}$ calculating module 216. The $A_{THR}$ module 216 determines an area of the throttle 16 that delivers sufficient airflow to the cylinders 18 and achieves $T_{REQ}$. $A_{THR}$ is output to the throttle 16 and is utilized to adjust the throttle position. $A_{THR}$ may also be utilized to actuate additional devices (e.g., the intake cam phaser 32, the exhaust cam phaser 34, the EGR system (not shown) and the intake manifold tuning valve 60) to achieve $T_{REQ}$.

The $PTP_{DES}$ calculation module 200 determines a $PTP_{DES}$ based on RPM, $APC_{DES}$ and $MAP_{DES}$. $PTP_{DES}$ is output to a summer 226 and the $PTP_{TOTAL}$ calculation module 201. The summer 226 receives $PTP_{DES}$ and $PTP_{MEAS}$ and outputs the sum to the $PTP_{MEAS}$ correction module 206. The $PTP_{MEAS}$ correcting module 206 outputs a corrected $PTP_{MEAS}$ to the $PTP_{TOTAL}$ calculation module 201. The $PTP_{TOTAL}$ calculation module outputs $PTP_{TOTAL}$ based on $PTP_{MEAS}$ and $PTP_{DES}$.

The bypass module 208 receives $PTP_{MEAS}$ and $PTP_{DES}$ and outputs a bypass valve signal. The bypass valve signal is used to adjust the position of the bypass valve 56 and to achieve $T_{REQ}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for an engine having a throttle, comprising:

a desired pre-throttle pressure module that receives a torque request signal and that determines a desired pre-throttle pressure;

an air-per-cylinder module that determines a desired air-per-cylinder of the throttle; and a manifold absolute pressure module that receives said torque request signal and that determines a desired manifold absolute pressure, wherein said desired pre-throttle pressure is based on said desired air-per-cylinder, said manifold absolute pressure and engine speed.

2. The engine control system of claim 1 further comprising a total pre-throttle pressure module that determines a total pre-throttle pressure based on said desired pre-throttle pressure and a measured pre-throttle pressure.

3. The engine control system of claim 1 further comprising a torque estimating module that determines an estimated torque based on said RPM.

4. The engine control system of claim 1 further comprising a correction module that corrects said measured pre-throttle pressure based on a predetermined correction factor.

5. The engine control system of claim 4 wherein said correction module corrects said estimated torque based on a predetermined correction factor.

6. The engine control system of claim 1 further comprising an engine control module that determines said measured pre-throttle pressure and that determines said engine speed.

7. The engine control system of claim 6 wherein said engine control module determines a desired mass air flow based on said desired air-per-cylinder.

8. The engine control system of claim 6 wherein said engine control module determines a throttle area based on said desired mass air flow.

9. A system comprising the engine control system of claim 1 and further comprising:

a turbocharger driven by exhaust from the engine; and a pressure sensor that is located upstream from said throttle and that measures a pre-throttle pressure, wherein said turbocharger delivers compressed air to the engine, and wherein a turbine speed of said turbocharger regulates a level of said pre-throttle pressure.

10. The system of claim 9 further comprising a turbine bypass valve that selectively opens based on said valve signal.

11. The system of claim 9 further comprising a driver input device that generates said torque request signal.

12. The system of claim 11 wherein said driver input device is an accelerator pedal.

13. The engine control system of claim 1 further comprising a bypass module that generates a valve signal based on said total pre-throttle pressure and engine speed.

14. The engine control system of claim 13 wherein said turbine bypass module generates said valve signal when said measured pre-throttle pressure exceeds a predetermined value.

15. The engine control system of claim 13 wherein said turbine bypass module generates said valve signal based on a reference table.

16. The engine control system of claim 15 wherein said reference table is based on engine speed and said total pre-throttle pressure.

17. A method for controlling torque comprising:

receiving a torque request signal;

determining a desired pre-throttle pressure;

determining a desired air-per-cylinder of the throttle;

receiving said torque request signal; and determining a desired manifold absolute pressure, wherein said desired pre-throttle pressure is based on said desired air-per-cylinder, said manifold absolute pressure and engine speed.

18. The method of claim 17 further comprising determining a total pre-throttle pressure based on said desired pre-throttle pressure and a measured pre-throttle pressure.

19. The method of claim 17 further comprising estimating a torque based on said RPM.

20. The method of claim 17 further comprising correcting said measured pre-throttle pressure based on a predetermined correction factor.

21. The method of claim 20 further comprising correcting said estimated torque based on a predetermined correction factor.

22. The method of claim 17 further comprising:

determining said measured pre-throttle pressure; and determines said engine speed.

23. The method of claim 22 further comprising determining a desired mass air flow based on said desired air-per-cylinder.

24. The method of claim 22 further comprising determining a throttle area based on said desired mass air flow.

25. The method of claim 17 further comprising;

measuring a pre-throttle pressure; and delivering compressed air to the engine.

26. The method of claim 25 further comprising selectively opening a turbine bypass valve based on said valve signal.

27. The method of claim 25 further comprising generating said torque request signal based on a driver input device.

28. The method of claim 27 wherein said driver input device is an accelerator pedal.

29. The method of claim 17 further comprising generating a valve signal based on said total pre-throttle pressure and engine speed.

30. The method of claim 29 further comprising generating said valve signal when said measured pre-throttle pressure exceeds a predetermined value.

31. The method of claim 29 further comprising generating said valve signal based on a reference table.

32. The method of claim 31 wherein said reference table is based on engine speed and said total pre-throttle pressure.

* * * * *